106. COMPOSITIONS, COATING OR PLASTIC. Calcium Naphthenate

UNITED STATES PATENT OFFICE.

DONALD DAVIDSON, OF CHICAGO, ILLINOIS, ASSIGNOR TO BRADLEY & VROOMAN COMPANY, OF CHICAGO, ILLINOIS, A CORPORATION OF ILLINOIS.

WATERPROOF CEMENT AND METHOD OF PRODUCING IT.

1,285,636.     Specification of Letters Patent.     Patented Nov. 26, 1918.

No Drawing.     Application filed August 12, 1918. Serial No. 249,435.

*To all whom it may concern:*

Be it known that I, DONALD DAVIDSON, a citizen of the United States, residing at Chicago, in the county of Cook and State of Illinois, have invented certain new and useful Improvements in Waterproof Cement and Methods of Producing It; and I do hereby declare the following to be a full, clear, and exact description of the invention, such as will enable others skilled in the art to which it appertains to make and use the same.

The object of the invention is to provide an inexpensive waterproofing material for Portland or other cement having the property of hydraulicity which can be added to the water with which the cement is to be mixed and which will render the resulting cement, when set, impervious to water.

The waterproofing material which I use is a by-product of petroleum refining and is that oxidation product of the same known as naphthenic acids. This petroleum oxidation product consists of acids which comport themselves very similarly to fatty acids. The naphthenic acids may also be produced directly by oxidizing crude petroleum, but mostly they are the result of refining petroleum. They are found chiefly as a by-product in the refining of Russian petroleum.

The chemical formula of naphthenic acids is supposed to be $C_7H_{13}COOH$ up to $C_{14}H_{27}COOH$, and naphthenic acids of commerce are usually mixtures which may consist substantially of any variation or proportions of acids included between the limits above indicated by the two formulas. The naphthenic acids of commerce may be used directly or they may be neutralized with some alkalinic solution, preferably a solution of ammonia, or of some ammonium salt. The solution or liquid resulting from this mixture is mixed with the water used in mixing the cement to form the mortar or concrete. The water used for making the mortar may contain about one-quarter of one per cent. of the said naphthenic acids, though the limits may vary somewhat. The naphthenic acids contained in the water with which the cement is mixed will react with the lime or other present or added substance adapted to form insoluble naphthenates in the cement, or with other metallic compounds which may be added for that purpose, such as barium or aluminum chlorid, and form an insoluble naphthenate in the finished cement.

Whether the naphthenic acid be added directly, as such, or in combination with a suitable base, is a matter of little difference as the final effect is the same. Naphthenic acids and naphthenates are to be regarded as equivalents in the present relation.

The naphthenic acids are considerably cheaper than the fatty acids sometimes used for the same purpose and make a better waterproofing cement than that resulting from the addition of fatty acids to the cement for waterproofing it. The peculiar advantage of naphthenic acids over fatty acids used for this purpose is their property of forming alkaline salts, which are readily soluble and which form perfect solutions in water, whereas the fatty acids form ropy, thick or gelatinous solutions which retard the uniform distribution of the waterproofing agent through the mass of the water and the cement formed therewith, and are not so readily soluble.

In cases where caustic soda is used in place of ammonia for neutralizing naphthenic acids, the proportions indicated below may be used in preparing the waterproofing solution: Mix by weight one hundred pounds of naphthenic acids with thirty pounds of caustic soda, and one thousand pounds of water. Stir the mixture until the acid and alkali combine; the sulting liquid will be a clear solution of slight viscosity. By mixing one part of the resulting solution with thirty parts of the water, to be used in forming the mortar or concrete, the resulting cement or concrete will be made waterproof.

My invention is applicable generally to cements having the quality of setting, as will be seen from the above.

I claim:

1. A waterproof cement comprising calcium naphthenate.

2. The process of rendering cement waterproof which consists in mixing therewith a small percentage of a naphthenic compound adapted to react with a calcium compound present in the cement to form in the body of the cement calcium naphthenate.

3. The process of rendering cement waterproof which consists in mixing the cementitious material with a solution of naphthenic compound, which compound is adapted to react with the calcium hydroxid present in the cement to form a calcium naphthenate.

4. The process of rendering cement waterproof which consists of mixing cement containing lime with a solution of an alkali naphthenate to form calcium naphthenate in the cement.

5. The process of rendering cement waterproof which consists in adding to a cement containing lime, ammonium naphthenate to form calcium naphthenate in the body of the cement.

6. The process of rendering cement waterproof which consists in mixing cement containing lime with water containing about one-quarter of 1 per cent. of ammonium naphthenate to change the lime in the body of the cement into calcium naphthenate.

7. A waterproof cement including an insoluble metallic naphthenate.

8. The process of rendering cement waterproof, which consists in mixing therewith a percentage of a naphthenic compound adapted to react with a metallic compound present in the cement to form in the body of the cement an insoluble metallic naphthenate.

9. The process of rendering hydraulic concrete waterproof, which consists in mixing with the concrete before setting begins, a solution of a naphthenic acid salt.

In testimony whereof I affix my signature.

DONALD DAVIDSON.

Copies of this patent may be obtained for five cents each, by addressing the "Commissioner of Patents, Washington, D. C."